US012744616B2

(12) United States Patent
Giorgi et al.

(10) Patent No.: US 12,744,616 B2
(45) Date of Patent: Sep. 22, 2026

(54) OPTICAL NETWORK UNIT, CENTRAL OFFICE NODE AND METHODS OF CONFIGURING AN OPTICAL NETWORK UNIT

(71) Applicant: Telefonaktiebolaget LM Ericsson (publ), Stockholm (SE)

(72) Inventors: Luca Giorgi, Pisa (IT); Fabio Cavaliere, Pisa (IT); Paola Iovanna, Pisa (IT); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 18/565,066

(22) PCT Filed: Jun. 7, 2021

(86) PCT No.: PCT/EP2021/065109
§ 371 (c)(1),
(2) Date: Nov. 28, 2023

(87) PCT Pub. No.: WO2022/258132
PCT Pub. Date: Dec. 15, 2022

(65) Prior Publication Data

US 2024/0259130 A1 Aug. 1, 2024

(51) Int. Cl.
*H04J 14/02* (2006.01)
*H04Q 11/00* (2006.01)

(52) U.S. Cl.
CPC ...... *H04J 14/0257* (2013.01); *H04J 14/0282* (2013.01); *H04Q 11/0067* (2013.01);
(Continued)

(58) Field of Classification Search
CPC .............. H04J 14/0257; H04J 14/0282; H04Q 11/0067; H04Q 2011/0064; H04Q 2011/0088
(Continued)

(56) References Cited

U.S. PATENT DOCUMENTS

2006/0115271 A1* 6/2006 Hwang ............... H04J 14/0252 398/72
2008/0166127 A1* 7/2008 Kazawa ............. H04J 14/0282 398/79
(Continued)

FOREIGN PATENT DOCUMENTS

EP 2538591 A1 12/2012
EP 2866383 A1 4/2015
(Continued)

OTHER PUBLICATIONS

PCT International Search Report, mailed Mar. 3, 2022, in connection with International Application No. PCT/EP2021/065109, all pages.
(Continued)

*Primary Examiner* — Dalzid E Singh
(74) *Attorney, Agent, or Firm* — Murphy, Bilak & Homiller, PLLC

(57) ABSTRACT

An optical network unit, ONU, for a passive optical network, PON. The ONU comprises a tunable receiver having a wavelength tunable operating wavelength, a tunable transmitter having a wavelength tunable operating wavelength and a controller comprising at least one processor and memory. The memory contains instructions which when executed by the at least one processor cause the ONU to perform operations of: if the tunable transmitter is on, switching the tunable transmitter off and if the tunable receiver is off, switching the tunable receiver on; determining an availability of a control channel; receiving a down-
(Continued)

stream control channel signal at a downstream control channel wavelength from a central office, CO, node of the PON, the downstream control channel signal carrying an indication of allocated operating wavelengths for the ONU; setting an operating wavelength of the tunable receiver to an allocated operating wavelength and setting the operating wavelength of the tunable transmitter to an allocated operating wavelength; and switching the tunable transmitter on.

16 Claims, 11 Drawing Sheets

(52) U.S. Cl.
CPC ................ *H04Q 2011/0064* (2013.01); *H04Q 2011/0088* (2013.01)

(58) Field of Classification Search
USPC .......................................................... 398/204
See application file for complete search history.

(56) References Cited

U.S. PATENT DOCUMENTS

2009/0080889 A1* 3/2009 Nozue ................ H04J 14/0232 398/72
2012/0315040 A1* 12/2012 Dahlfort ............ H04J 14/0257 398/58
2013/0094862 A1* 4/2013 Luo .................... H04J 14/0282 398/68
2015/0055957 A1 2/2015 Lee et al.
2016/0020868 A1* 1/2016 Lee .................... H04J 14/0241 398/58
2016/0099792 A1* 4/2016 Gao ................... H04J 14/0246 398/68
2016/0309245 A1* 10/2016 Effenberger ....... H04Q 11/0005
2025/0047406 A1* 2/2025 Iovanna ............. H04J 14/0275

FOREIGN PATENT DOCUMENTS

EP 3217682 A1 9/2017
WO 2014122525 A1 8/2014

OTHER PUBLICATIONS

PCT Written Opinion, mailed Mar. 3, 2022, in connection with International Application No. PCT/EP2021/065109, all pages.
3GPP TR 38.801, V14.0.0, Mar. 2017, 3rd Generation Partnership Project; Technical Specification Group Radio Access Network; Study on new radio access technology: Radio access architecture and interfaces, Release 14, 91 pages.
ITU-T, Telecommunication Standardization Sector of ITU, Series G, Supplement 66, Sep. 2020, Series G: Transmission Systems and Media, Digital Systems and Networks, 5G wireless fronthaul requirements in a passive optical network context, 44 pages.
3GPP TS 38.104, V17.0.0, Dec. 2020, 3rd Generation Partnership Project; Technical Specification Group Radio Access Network; NR; Base Station (BS) radio transmission and reception, Release 17.

* cited by examiner

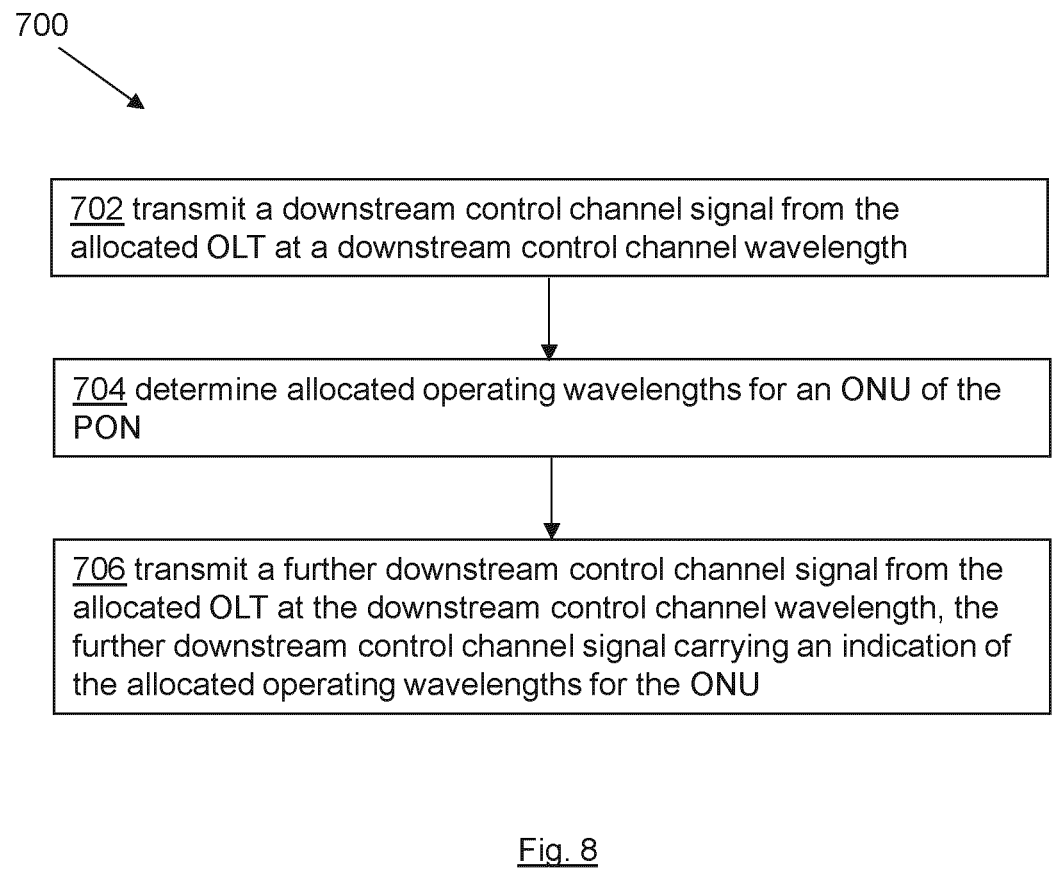

700

702 transmit a downstream control channel signal from the allocated OLT at a downstream control channel wavelength 704 determine allocated operating wavelengths for an ONU of the PON 706 transmit a further downstream control channel signal from the allocated OLT at the downstream control channel wavelength, the further downstream control channel signal carrying an indication of the allocated operating wavelengths for the ONU

Fig. 8

OPTICAL NETWORK UNIT, CENTRAL OFFICE NODE AND METHODS OF CONFIGURING AN OPTICAL NETWORK UNIT

TECHNICAL FIELD

The invention relates to an optical network unit, ONU, for a passive optical network, PON and a central office, CO, node for a PON. The invention further relates to a method of configuring an ONU of a PON and a method of controlling an operating wavelength of an ONU of a passive optical network, PON.

BACKGROUND

Using installed PONs for other purposes, for example mobile fronthaul and backhaul, enables reuse of existing infrastructure to carry new services, saving the cost of new installations. Another advantage of using a PON for mobile transport purposes is its bidirectional operation; a PON uses a single fiber for both upstream, US, and downstream, DS propagation directions. This simplifies installation procedures, since it is not necessary to take care identifying which fiber is used for DS and which for US.

Mobile transport over PON is addressed in the ITU-T Supplement G.Sup66, which considers two scenarios: 1) a hybrid scenario with fixed access services running over a legacy time division multiplexed, TDM, PON, plus a wavelength division multiplexing, WDM, overlay reserved to wireless services; and 2) a TDM PON fully dedicated to wireless services. In the first scenario, point to point wavelengths, different from the US and DS wavelengths of the legacy PON, are used for wireless services. A coexistence filter couples the legacy PON optical line terminations, OLTs, to the WDM systems used for wireless services. In the second scenario, dedicated wavelengths are used for latency demanding services or time-sensitive fronthaul interfaces (for example, those using the common public radio interface, CPRI, or the enhanced CPRI, eCPRI), while other services are managed using Dynamic Bandwidth Allocation, DBA, algorithms. However, conventional DBAs introduce several milliseconds of delay and significant packet delay variation, which is not compatible with most of the new real-time services enabled by 5G.

To reduce the number of equipment variants due to the high number of wavelengths in a PON, the use of full-tunable Optical Network Terminations, ONT, (also known as optical network units, ONUs) is required. A full-tunable ONT is able to transmit and receive at every wavelength of the wavelengths plan of the PON. Many operators require the use of existing deployed PON infrastructure as it is, without installing wavelength selective devices at the distribution node, but just using the installed wavelength agnostic distribution node that comprises a power splitter. This requires the presence of an optical tunable filter at the receiver side of the full-tunable ONT, in addition to a tunable laser at the transmitter side, as regularly implemented in commercial transceivers. According to ITU-T Supplement G.Sup66, the use of full tunable WDM transceivers is recommended at the ONT and optional, though desirable, at the OLT, where traditional fixed-wavelengths pluggable transceivers and wavelength multiplexers and demultiplexers can alternatively be used.

An issue with WDM systems is their high number of wavelengths, which requires the provision of a high number of spare parts (one per wavelength) and the labelling of each ONT port with the corresponding wavelength. This increases the complexity and cost of the network operation and maintenance processes. Moreover, the PON optical distribution node, ODN, is based on power splitters that don't have the capability to select the wavelength. Hence, wavelength demultiplexers or wavelength selective optical filters must be cascaded to the ODN splitter or embedded in the ONU, respectively. A full tunable WDM Transceiver, TRX, i.e. a transceiver including a tunable laser at the transmitter and a tunable optical filter at the receiver, is the device that allows to solve the issue.

Optical filters able to tune over a sufficiently high number of wavelengths (e.g. 20 WDM channels, 100 GHz spaced in the C band) are the enabling technology of full tunable TRXs. However, they need to be set at the proper wavelength. Although this can be done manually, an automated procedure is desirable to reduce the network provisioning costs by means of plug&play devices, that reduce the installation times and do not require sending in field highly specialized personnel. Enabling remote reconfiguration of the wavelength allocation, rather than manually replacing the filters at the ONUs.

Automatically configuring a tunable filter at the ONU receiver is not trivial since no control channel signal can reach it until the right wavelength is set. Moreover, since in practical systems transmitted and received wavelengths are not independent but paired (e.g. separated by a fixed interval often referred to as free spectral range, FSR), setting the wrong received wavelength will result in setting the wrong transmitted wavelength, which can result in jamming another channel, known as 'rogue ONT'.

SUMMARY

It is an object to provide an improved optical network unit, ONU, for a passive optical network, PON. It is a further object to provide an improved a central office, CO, node for a PON. It is a further object to provide an improved method of configuring an ONU of a PON. It is a further object to provide an improved method of controlling an operating wavelength of an ONU of a passive optical network, PON.

An aspect provides an optical network unit, ONU, for a passive optical network, PON. The ONU comprises a tunable receiver having a wavelength tunable operating wavelength, a tunable transmitter having a wavelength tunable operating wavelength, and a controller. The controller comprises at least one processor and memory containing instructions which when executed by the at least one processor cause the ONU to perform operations as follows. If the tunable transmitter is switched on, switching off the tunable transmitter and if the tunable receiver is switched off, switching on the tunable receiver. An operation of determining an availability of a control channel. An operation of receiving a downstream control channel signal at a downstream control channel wavelength from a central office, CO, node of the PON. The downstream control channel signal carries an indication of allocated operating wavelengths for the ONU. An operation of setting an operating wavelength of the tunable receiver to an allocated operating wavelength and setting the operating wavelength of the tunable transmitter to an allocated operating wavelength. An operation of switching the tunable transmitter on.

Advantageously, a full-tunable ONU for a PON is provided that is able to automatically (i.e. without requiring manual intervention) set both tunable receiver and tunable transmitter at the correct operating wavelength without disrupting existing operational channels. The ONU enables the tunable transmitter to be switched on for upstream communication traffic when the ONU knows the assigned operating wavelength, advantageously avoiding the ONU jamming already operating channels.

The ONU is advantageously enabled for use in a PON having a power splitter at the distribution node, DN, i.e. the DN is not wavelength selective and lets all of the wavelengths of the PON wavelength grid concurrently pass through it. The ONU enables higher production volumes for full-tunable WDM ONUs, with associated cost reduction. It makes it possible for operators to buy a low number of spare parts, to deal with unpredictable traffic evolution without waste of bandwidth, allowing ONUs to switch-on and switch-off in a random sequence. The ONU supports all relevant network operations, including network installation, fault recovery, and network reconfiguration. The ONU enables a dynamic reconfiguration of a wavelength allocation plan.

In an embodiment the operation of receiving a downstream control channel signal from the CO node follows additional operations of setting the operating wavelength of the tunable transmitter to an upstream control channel wavelength and switching on the tunable transmitter, and transmitting an upstream control channel signal to the CO node following determining the control channel is available to the ONU. The upstream control channel signal carries an indication of an ID of the ONU. The tunable transmitter is switched off before commencing the operation of setting the operating wavelengths of the tunable receiver and the tunable transmitter to the allocated operating wavelengths.

The ONU is enabled to automatically set both tunable receiver and tunable transmitter at both the correct control channel wavelength and the correct operating wavelength without disrupting existing operational channels. The ONU enables the tunable transmitter to only be switched on for upstream control channel signals when the ONU knows that the control channel is available to the ONU and enables the tunable transmitter to only be switched on for upstream communication traffic when the ONU knows the assigned operating wavelength, advantageously avoiding the ONU jamming already operating channels during set up.

In an embodiment, the operation of determining an availability of a control channel comprises operations as follows. An operation of setting the operating wavelength of the tunable receiver to a default downstream control channel wavelength. An operation of determining presence or absence of a downstream control channel signal at the default downstream control channel wavelength. An operation of, in response to determining presence of a downstream control channel signal, determining when the control channel becomes available for use by the ONU.

The tunable receiver is able to be tuned without disturbing the existing channels and, once the control channel is determined to be present and available, an upstream control channel signal can be sent by the tunable transmitter to a CO of the PON, so that the CO can coordinate the operational wavelength setting of the ONU and transmission of communication traffic can safely start.

In an embodiment, determining when the control channel becomes available for use by the ONU comprises determining a subsequent absence of the downstream control channel signal. The ONU is thus enabled to be used with a control channel which is not always on and/or not always at the same wavelength and/or not always available, simply by determining a sequence of presence of a downstream control channel signal at a default control channel wavelength followed by absence of the downstream control channel signal.

In an embodiment, the downstream control channel signal carries information including a status flag indicative of availability or unavailability of the control channel. Determining when the control channel becomes available for use by the ONU comprises determining that the status flag is indicative of availability of the control channel. The ONU is thus enabled to be used with a control channel that is always transmitting on the same wavelength channel, to all ONUs of a PON.

Corresponding embodiments and advantages also apply to the method of configuring an optical network unit, ONU, of a passive optical network, PON, described below.

An aspect provides a central office, CO, node for a passive optical network, PON. The CO node comprises a plurality of optical line terminations, OLTs, and a controller. The OLTs are operable at respective channel wavelengths of the PON. One of the OLTs is allocated to a control channel. The controller comprises at least one processor and memory containing instructions which when executed by the at least one processor cause the CO node to perform operations as follows. An operation of transmitting a downstream control channel signal from the allocated OLT at a downstream control channel wavelength. An operation of determining allocated operating wavelengths for an ONU of the PON. An operation of transmitting a further downstream control channel signal from the allocated OLT at the downstream control channel wavelength. The further downstream control channel signal carries an indication of the allocated operating wavelengths for the ONU.

Advantageously, CO is enabled to remotely control the operating wavelength of a full-tunable ONU for a PON without disrupting existing operational channels. The CO enables a dynamic reconfiguration of the wavelength allocation plan, so that at the CO the information on allocated channels and non-allocated channels is always available.

The CO is advantageously enabled for use in a PON having a power splitter at the distribution node, DN, i.e. the DN is not wavelength selective and lets all of the wavelengths of the PON wavelength grid concurrently pass through it. The CO enables higher production volumes for full-tunable WDM ONUs, with associated cost reduction. It makes it possible for operators to buy a low number of spare parts, to deal with unpredictable traffic evolution without waste of bandwidth, allowing the CO to control the operating wavelengths of ONUs as they switch-on and switch-off in a random sequence. The CO supports all relevant network operations, including network installation, fault recovery, and network reconfiguration.

In an embodiment, the operation of determining allocated operating wavelengths comprises operations of receiving at the allocated OLT an upstream control channel signal from the ONU at an upstream control channel wavelength and determining the allocated operating wavelengths for the ONU depending on the ID. The upstream control channel signal carries an indication of an identification, ID, of the ONU. The CO enables a dynamic reconfiguration of the wavelengths allocation plan.

In an embodiment, the memory further contains a wavelengths allocation table. The operation of determining allocated operating wavelengths for an ONU comprises obtaining operating wavelengths from the wavelengths allocation table until all wavelengths within the wavelengths allocation table have been allocated and then using the control channel wavelengths as operating wavelengths. The CO enables a dynamic reconfiguration of the wavelength allocation plan, so that at the CO the information on allocated channels and non-allocated channels is always available.

In an embodiment, transmitting the downstream control channel signal is followed by stopping transmitting the downstream control channel signal to indicate that the control channel is available for use. The CO is enabled to communicate control channel availability to an ONU by simple presence/absence signalling of the control channel signal.

In an embodiment, downstream control channel signals carry information including a status flag indicative of availability or unavailability of the control channel. During transmitting the downstream control signal the status flag is indicative of availability and during transmitting the further downstream control channel signal the status flag is indicative of unavailability. The CO is thus enabled to operate the downstream control channel in an 'always-on' manner, at a dedicated control channel wavelength.

Corresponding embodiments and advantages also apply to the method of controlling an operating wavelength of an optical network unit, ONU, of a passive optical network, PON, described below.

An aspect provides a method of configuring an optical network unit, ONU, of a passive optical network. The ONU comprises a tunable transmitter and a tunable receiver. The method comprises steps as follows. If the tunable transmitter is switched on, switching off the tunable transmitter and if the tunable receiver is switched off, switching on the tunable receiver. An availability of a control channel is determined. A downstream control channel signal at a downstream control channel wavelength is received from a central office, CO, node of the PON. The downstream control channel signal carries an indication of allocated operating wavelengths for the ONU. An operating wavelength of the tunable receiver is set to an allocated operating wavelength and the operating wavelength of the tunable transmitter is set to an allocated operating wavelength. The tunable transmitter is switched on.

The method is compliant with any radio architectures, any transport architecture (e.g. configured by SDN controller and/or Network Management System) and future proof for ORAN. The method enables a dynamic reconfiguration of the wavelengths allocation plan, so that at the CO the information on allocated channels and non-allocated channels is always available.

In an embodiment, the step of receiving a downstream control channel signal from the CO node follows setting the operating wavelength of the tunable transmitter to an upstream control channel wavelength and switching on the tunable transmitter, and transmitting an upstream control channel signal to the CO node following determining the control channel is available to the ONU. The upstream control channel signal carries an indication of an ID of the ONU. The tunable transmitter is switched off before commencing the operation of setting the operating wavelengths of the tunable receiver and the tunable transmitter to the allocated operating wavelengths.

In an embodiment, the step of determining an availability of a control channel comprises steps as follows. The operating wavelength of the tunable receiver is set to a default downstream control channel wavelength. Presence or absence of a downstream control channel signal at the default downstream control channel wavelength is determined. In response to determining presence of a downstream control channel signal, it is determined when the control channel becomes available for use by the ONU.

In an embodiment, determining when the control channel becomes available for use by the ONU comprises determining a subsequent absence of the downstream control channel signal.

In an embodiment, the downstream control channel signal carries information including a status flag indicative of availability or unavailability of the control channel. Determining when the control channel becomes available for use by the ONU comprises determining that the status flag is indicative of availability of the control channel.

An aspect provides a method of controlling an operating wavelength of an optical network unit, ONU, of a passive optical network, PON. The ONU comprises a tunable transmitter and a tunable receiver. The method comprises the following steps at a central office, CO, node of the PON. A downstream control channel signal is transmitted from the allocated OLT at a downstream control channel wavelength. Allocated operating wavelengths are determined for an ONU of the PON. A further downstream control channel signal is transmitted from the allocated OLT at the downstream control channel wavelength, the further downstream control channel signal carrying an indication of the allocated operating wavelengths for the ONU.

The method is compliant with any radio architectures, any transport architecture (e.g. configured by SDN controller and/or Network Management System) and future proof for ORAN. The method enables a dynamic reconfiguration of the wavelength allocation plan, so that at the CO the information on allocated channels and non-allocated channels is always available.

In an embodiment, the step of determining allocated operating wavelengths comprises receiving at the allocated OLT an upstream control channel signal from the ONU at an upstream control channel wavelength, and determining the allocated operating wavelengths for the ONU depending on the ID. The upstream control channel signal carries an indication of an identification, ID, of the ONU.

In an embodiment, the step of determining allocated operating wavelengths for an ONU comprises obtaining operating wavelengths from a wavelengths allocation table until all wavelengths within the wavelengths allocation table have been allocated and then using the control channel wavelengths as operating wavelengths.

In an embodiment, transmitting the downstream control channel signal is followed by stopping transmitting the downstream control channel signal to indicate that the control channel is available for use.

In an embodiment, downstream control channel signals carry information including a status flag indicative of availability or unavailability of the control channel. During transmitting the downstream control channel signal the status flag is indicative of availability and during transmitting the further downstream control channel signal the status flag is indicative of unavailability.

An aspect provides a passive optical network comprising a central office, CO, node, a plurality of optical network units, ONUs, and a wavelength agnostic distribution node connected to the CO by a feeder fiber and connected to the plurality of ONUs by a plurality of drop fibers.

In an embodiment, the passive optical network further comprises a plurality of legacy optical line terminations, OLTs, at the CO, a plurality of legacy ONUs, a first coexistence filter and at least one further coexistence filter. The first coexistence filter couples the OLTs and the legacy OLTs to the feeder fiber. The at least one further coexistence filter couples an ONU and a legacy ONU to the distribution node.

Embodiments of the invention will now be described, by way of example only, with reference to the accompanying drawings.

BRIEF DESCRIPTION OF THE DRAWINGS

FIGS. 6 to 12 are flowcharts illustrating embodiments of method steps.

DETAILED DESCRIPTION

The same reference numbers will used for corresponding features in different embodiments.

Figure 1:
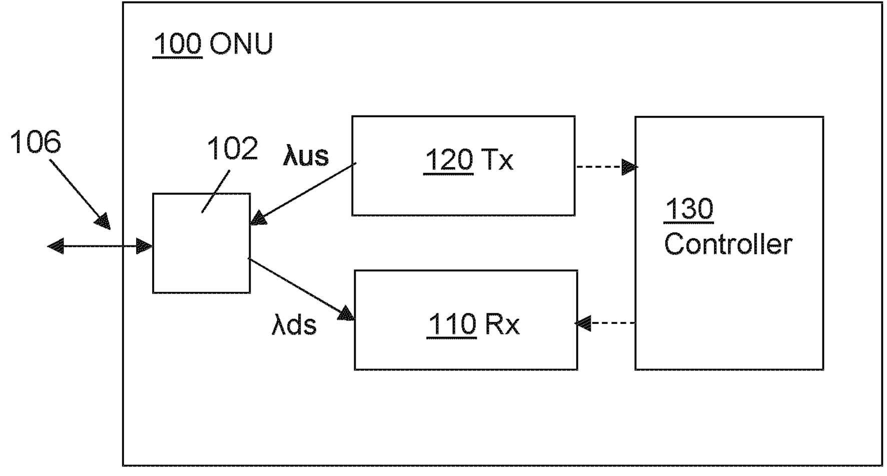
FIGS. 1 and 2 are block diagrams illustrating embodiments of an optical network unit, ONU, for a passive optical network, PON.

An embodiment, shown in FIG. 1, provides an optical network unit, ONU, 100 for a passive optical network, PON. The ONU comprises a tunable receiver, Rx, 110 having a wavelength tunable operating wavelength, a tunable transmitter, Tx, 120 having a wavelength tunable operating wavelength and a coupling device 102 arranged to couple the tunable Rx and the tunable Tx to an input/output port of the ONU. The ONU also comprises a controller 130.

The controller 130 comprises at least one processor and memory containing instructions which when executed by the at least one processor cause the ONU to perform the following operations.

If the tunable transmitter is on, switching the tunable transmitter off and if the tunable receiver is off, switching the tunable receiver on.

For example, if the ONU is not yet installed in the PON, meaning the tunable transmitter 120 and the tunable receiver 110 are currently switched off, the tunable receiver is switched on. If the ONU is already installed in the PON and has been operating at previously allocated operating wavelengths, meaning the tunable transmitter 120 and the tunable receiver 110 are currently switched on, the tunable transmitter is switched off.

An availability of a control channel is then determined. A downstream, DS, control channel signal at a downstream control channel wavelength is received by the tunable receiver from a central office, CO, node of the PON. The DS control channel signal carries an indication of allocated operating wavelengths for the ONU. The allocated operating wavelengths are a pair of wavelengths, i.e. one wavelength for downstream signals and a different wavelength for upstream signals. Alternatively, the allocated operating wavelengths may be the same wavelength for both downstream and upstream signals.

An operating wavelength of the tunable receiver is then set to the allocated operating wavelength for downstream signals, $\lambda_{DS}$, and the operating wavelength of the tunable transmitter is set to the allocated operating wavelength, $\lambda_{US}$, for upstream signals. The tunable transmitter is then switched on for upstream transmission.

The PON may comprise a wavelength agnostic (i.e. non-wavelength selective) distribution node, such as a passive splitter.

Figure 2:
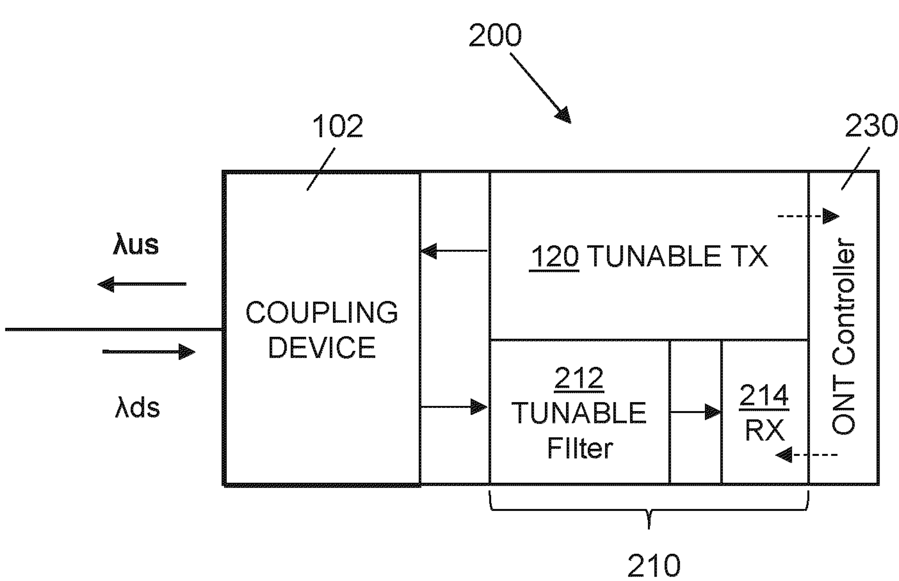

An embodiment, shown in FIG. 2, provides an optical network unit, ONU, 200 for a passive optical network, PON. As the skilled person will know, an ONU may also known as an optical network termination, ONT. The ONU comprises a tunable receiver 210 having a wavelength tunable operating wavelength, a tunable transmitter, Tx, 120 having a wavelength tunable operating wavelength and a controller 230.

The tunable receiver 210 comprises a tunable filter 212 having a wavelength tunable passband and a receiver, Rx, 214. In this embodiment, setting the operating wavelength of the tunable receiver refers to setting the passband wavelength of the tunable filter.

Referring to either FIG. 1 or FIG. 2, in an embodiment the controller 130, 230 memory contains instructions which when executed by the at least one processor cause the ONU to perform the following operations.

As described above, if the tunable transmitter 120 is on, switching the tunable transmitter off and if the tunable receiver 110, 210 is off, switching the tunable receiver on.

An availability of a control channel is then determined. The operating wavelength of the tunable transmitter 120 is set to an upstream control channel wavelength and the tunable transmitter is switched on. An upstream control channel signal is transmitted by the tunable transmitter following determining the control channel is available to the ONU. The upstream control channel signal carries an indication of an ID of the ONU and is sent to a central office, CO, node of the PON. A downstream, DS, control channel signal at a downstream control channel wavelength is received by the tunable receiver from the CO node. The DS control channel signal carries an indication of allocated operating wavelengths for the ONU. The allocated operating wavelengths are a pair of wavelengths, i.e. one wavelength for downstream signals and a different wavelength for upstream signals. Alternatively, the allocated operating wavelengths may be the same wavelength for both downstream and upstream signals.

The tunable transmitter 120 is switched off. Then, an operating wavelength of the tunable receiver 110, 210 is set to the allocated operating wavelength for downstream signals, $\lambda_{DS}$, and the operating wavelength of the tunable transmitter is set to the allocated operating wavelength, $\lambda_{US}$, for upstream signals. The tunable transmitter is then switched back on, for upstream transmission at the allocated upstream wavelength, $\lambda_{US}$.

In an embodiment, the operation of determining an availability of a control channel comprises the following operations. Setting the operating wavelength of the tunable receiver 110, 210 to a default downstream control channel wavelength. Then, determining the presence or absence of a downstream control channel signal at the default downstream control channel wavelength, and, in response to determining the presence of a downstream control channel signal, determining when the control channel becomes available for use by the ONU.

In an embodiment, the operation of determining when the control channel becomes available for use by the ONU comprises determining an absence of the downstream control channel signal subsequent to having determined the presence of a downstream control channel signal.

In an embodiment, the downstream control channel signal carries information including a status flag indicative of availability or unavailability of the control channel. The operation of determining when the control channel becomes available for use by the ONU comprises determining that the status flag is indicative of availability of the control channel.

Figure 3:
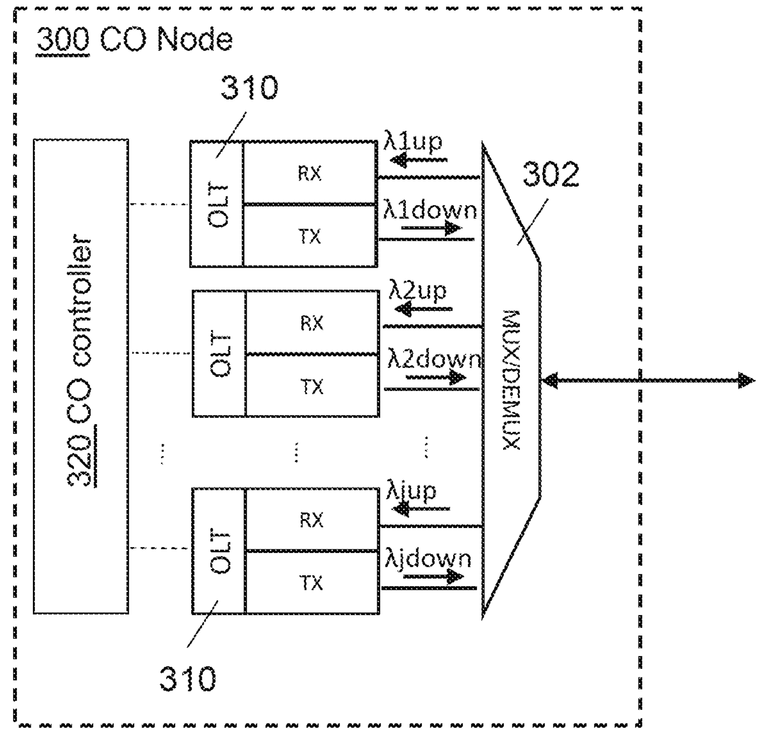
FIG. 3 is a block diagram illustrating an embodiment of a central office, CO, node for a PON.

Referring to FIG. 3, an embodiment provides a central office, CO, node 300 for a passive optical network, PON. The CO node comprises a plurality of optical line terminations, OLTs, 310 and a controller 320.

The OLTs are operable at respective channel wavelength pairs (λ1up, (λ1down . . . λjup, (λjdown) of the PON; one of the OLTs, and its wavelength pair, is allocated to a control channel. A multiplexer/demultiplexer 302 couples the OLTs to a transmission fibre. The multiplexer/demultiplexer multiplexes the j WDM downstream wavelengths (λ1down, λ2 down, λ3 down . . . , λjdown) for transmission on the transmission fibre and demultiplexes the upstream wavelengths (λ1up, λ2up, λ3up . . . , λjup) received from the transmission fibre.

The controller 320 comprises at least one processor and memory containing instructions which when executed by the at least one processor cause the CO node to perform the following operations. The CO node transmits a downstream control channel signal from the allocated OLT at a downstream control channel wavelength. The CO node determines allocated operating wavelengths for an optical network unit, ONU, of the PON. The allocated operating wavelengths for an ONU are a pair of wavelengths matching the channel wavelength pair of one of the OLTs.

The CO node then transmits a further downstream control channel signal from the allocated OLT at the downstream control channel wavelength. The further downstream control channel signal carries an indication of the allocated operating wavelengths for the ONU.

In an embodiment, the CO node is caused to determine the allocated operating wavelengths by receiving, at the allocated OLT, an upstream control channel signal from the ONU. The upstream control channel signal is at an upstream control channel wavelength and the upstream control channel signal carries an indication of an identification, ID, of the ONU. The allocated operating wavelengths for the ONU are then determined by the CO node depending on the ID of the ONU.

The allocated operating wavelengths are a pair of wavelengths, i.e. one wavelength for downstream signals and a different wavelength for upstream signals. Alternatively, the allocated operating wavelengths may be the same wavelength for both downstream and upstream signals.

In an embodiment, the memory further contains a wavelengths allocation table. The CO node is caused to determine the allocated operating wavelengths for an ONU by obtaining operating wavelengths from the wavelengths allocation table until all wavelengths within the wavelengths allocation table have been allocated. Once all the wavelengths have been allocated, the CO node uses the control channel wavelengths as operating wavelengths for a last installed ONU. If an ONU goes out of service, the CO node can assign the allocated operating wavelengths of that ONU as control channel wavelengths.

In an embodiment, following transmitting the downstream control channel signal CO node causes transmission of the downstream control channel signal to stop, to indicate that the control channel is available for use.

In an embodiment, downstream control channel signals carry information including a status flag indicative of availability or unavailability of the control channel. During transmitting the downstream control signal, the status flag is indicative of availability. During transmitting the further downstream control channel signal, the status flag is indicative of unavailability.

Figure 4:
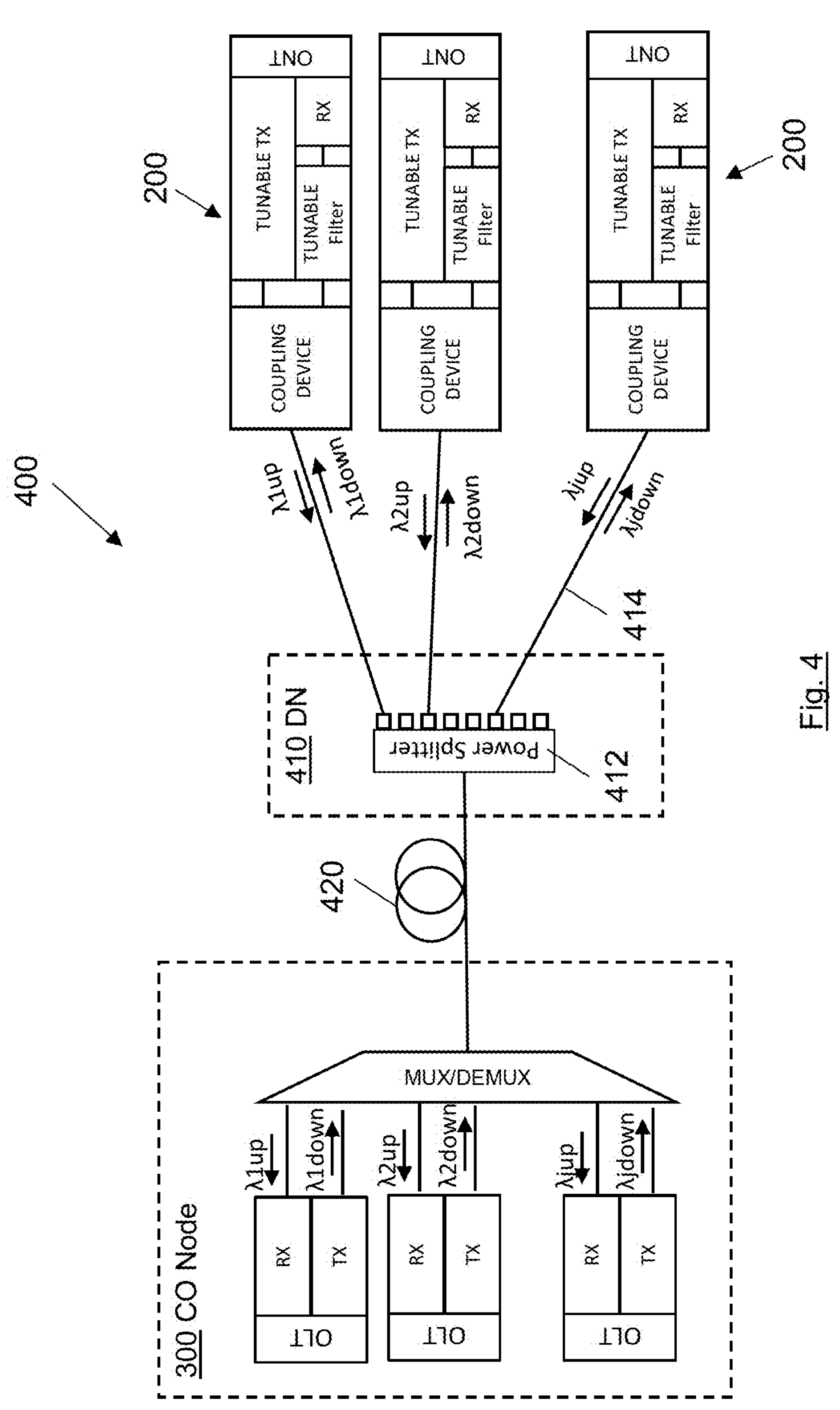
FIGS. 4 and 5 are block diagrams illustrating embodiments of a passive optical network, PON.

Referring to FIG. 4, an embodiment provides a passive optical network, PON, 400 comprising a central office, CO, node 300, optical network units, ONUs, 200 and a distribution node, DN, 410.

The CO node 300 is as described above with reference to FIG. 3. The OLTs of the CO node may be fixed wavelength ONTs or may be full tunable ONTs.

The ONUs 200 are as described above with reference to FIG. 2, although it will be appreciated that ONUs 100 as described above with reference to FIG. 1 may alternatively be used. Each ONU has respective allocated operating wavelengths, $\lambda 1_{up}$, $\lambda 1_{down}$ . . . $\lambda j_{up}$, $\lambda j_{down}$.

The DN 410 is a wavelength agnostic DN comprising a conventional passive power splitter 412 with typical splitting ratios of 1:16, 1:32, 1:64 or 1:128. The DN is connected to the CO 300 by a feeder fiber 420 and is connected to the ONUs 200 by respective drop fibers 414.

Figure 5:
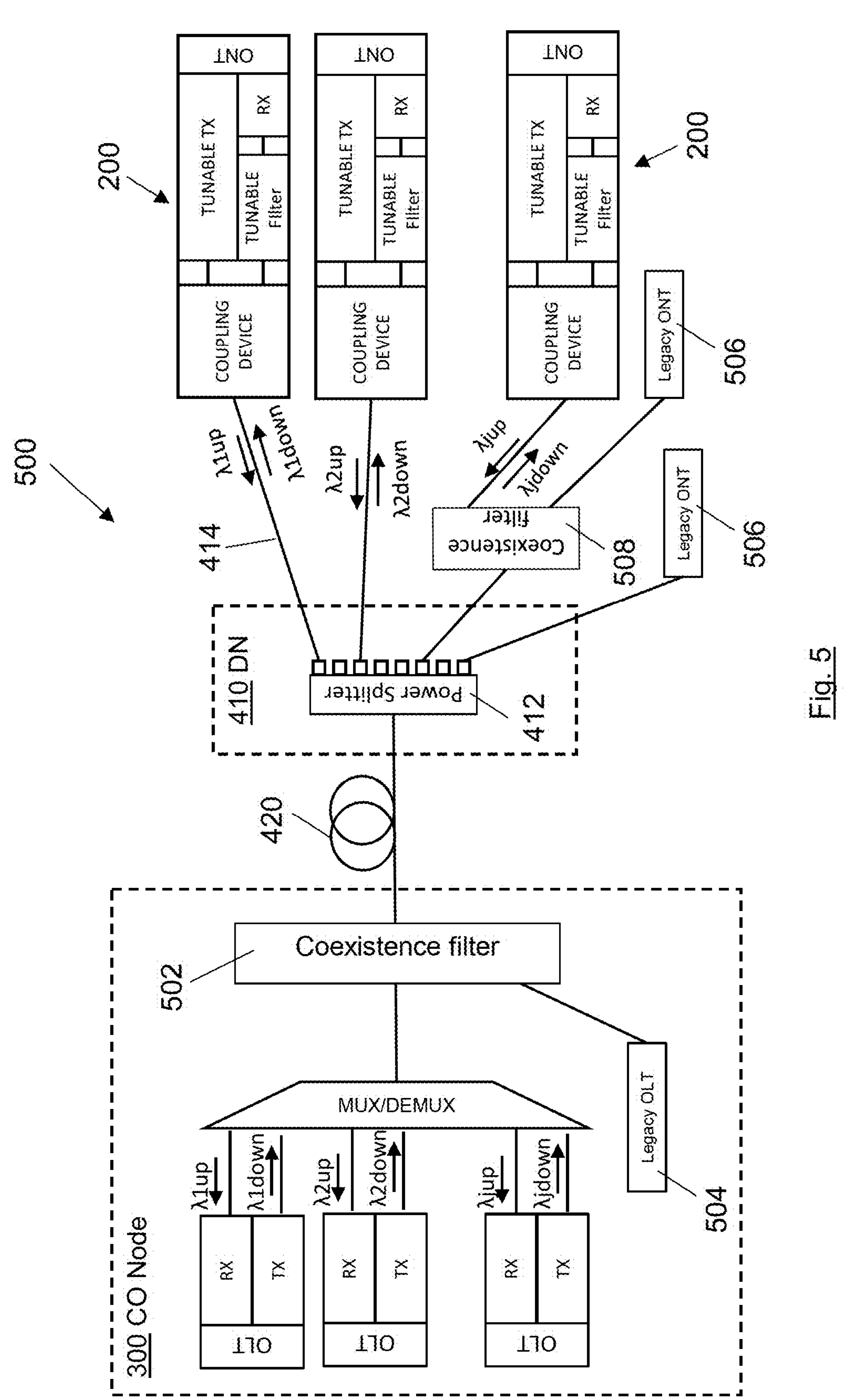

In an embodiment, illustrated in FIG. 5, the PON 500 further comprises a plurality of legacy optical line terminations, OLTs, 504 at the CO node 300 and a plurality of legacy ONUs 506. A first coexistence filter 502 couples the OLTs and the legacy OLTs to the feeder fiber and a further coexistence filter 508 couples an ONU 200 and a legacy ONU 506 to the DN 410. Alternatively, the further coexistence filter 508 may be provided before the DN 410.

FIG. 5 illustrates the concept of overlay of a WDM system comprising the CO node 300 functionality of FIG. 3 and the ONUs 100, 200 of FIGS. 1 and 2 on an existing, legacy time division multiplexing, TDM, PON. The WDM system may be used for mobile services while the legacy TDM PON continues to be used for transport of other communications traffic. WDM channels are transmitted from the CO node, to the full tunable transceivers at the ONUs located at remote sites, for example antenna sites. The coexistence filters multiplex and demultiplex PON legacy signals with the WDM channels on the same feeder fiber, coupling the WDM systems used for mobile services to the legacy PON.

The Central Office 300 comprises:

- OLTs 504 for WDM transmission; fixed wavelength transmitters or tunable transmitters may be used.
- passive MUX/DEMUX device; diplexer 302.
- first coexistence optical filter 502; multiplexes and demultiplexes PON legacy signals with WDM channels on the feeder fiber 420.
- PON legacy OLT 504 sharing the PON infrastructure with the WDM channels, The further coexistence filter 508 is provided between the DN and one of the ONUs 200 and a legacy ONU 506. This multiplexes and demultiplexes PON legacy signals with WDM channels on the respective drop fiber 414.

As described above, each ONU 200 comprises a fully tunable transceiver (tunable TX 120 and tunable RX 210) and a coupling device to combine the upstream and downstream signals on the respective drop fiber 414. The tunable TX 120 comprises a programmable tunable laser and the tunable RX 210 comprises an RX 214 and a programmable tunable filter 212 that selects the desired wavelength.

The full-tunable ONU 200 can receive and transmit all the WDM wavelengths in the allocated spectrum of the WDM channels. The ONU 200 enables setting both tunable filter and tunable laser at the correct allocated operating wavelengths without disrupting channels that are already operational. Since the power splitter 412 at the DN 410 is not wavelength selective (i.e. it lets all wavelengths pass through it), this means that the tunable laser is switched on only when it knows its allocated operating wavelength, avoiding jamming already operating channels. The tunable filter plays a fundamental role since its bandpass transfer function can be tuned without disturbing the existing channels and, once the correct wavelength is found for the control channel, the transmitter is set to the upstream control channel wavelength and transmits an upstream control channel signal to the CO with a notification of the ONU ID, so that the CO can coordinate the operating wavelength allocation for the ONUs and communication of traffic can safely start.

As described above in one embodiment the ONU 200 takes responsibility for identifying an available control channel and in another embodiment the ONT at the CO allocated to the control channel is always transmitting a downstream control channel signal at the downstream control channel wavelength; the DS control channel signal carries information including a status flag indicative of availability or unavailability of the control channel.

In an embodiment, information carried by the control channel signals is framed. For the DS control channel signal, some bytes of the frame overhead are used to identify it to the ONU as being the control channel and other bytes are reserved to indicate whether the control channel is available or whether it is being used by another ONU.

In both of these embodiments, the CO obtains allocated operating wavelengths for the ONUs from a wavelengths table that can be dynamically updated. The table may be provided from a transport controller (for example, in a software defined networking SDN, implementation), a radio/mobile network (for example, a Base Band unit in case of Centralized RAN), a Network management System, or a Command Line Interface, CLI.

Figure 6:
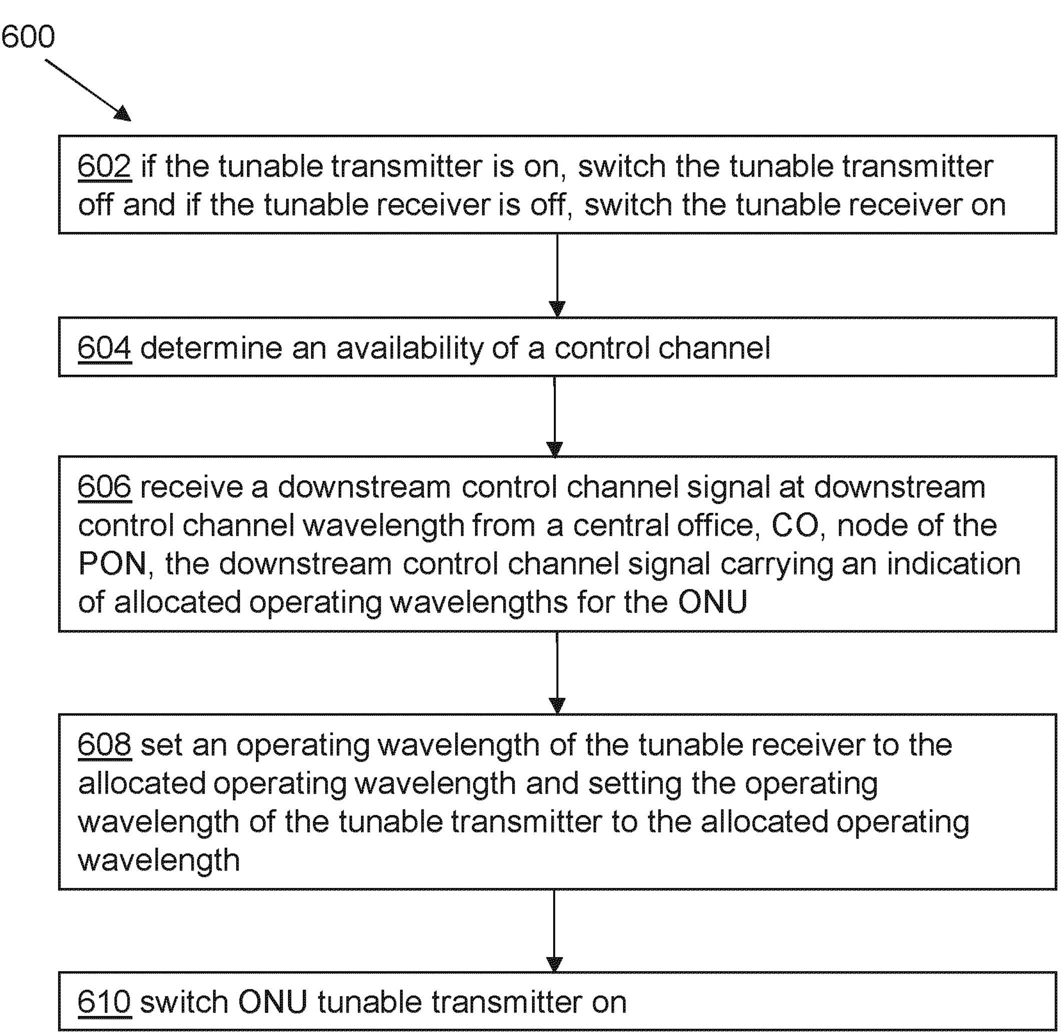

The wavelengths in the wavelengths table may be modified dynamically for several reasons including:

- when some wavelengths are assigned to other transceivers for any reason
- when a fault occurs on the transport network impacting the use of the wavelength
- when fault occurs at the mobile network using the WDM overlay and the corresponding wavelength cannot be used Referring to FIG. 6, an embodiment provides a method 600 of configuring an optical network unit, ONU, of a passive optical network. The ONU comprises a tunable transmitter and a tunable receiver.

The method comprises steps of:

- if the tunable transmitter is on, switching the tunable transmitter off 602 and if the tunable receiver is off, switching the tunable receiver on 602;
- determining 604 an availability of a control channel;
- receiving 606 a downstream control channel signal at a downstream control channel wavelength from a central office, CO, node of the PON, the downstream control channel signal carrying an indication of allocated operating wavelengths for the ONU;
- setting 608 an operating wavelength of the tunable receiver to an allocated downstream operating wavelength and setting the operating wavelength of the tunable transmitter to an allocated upstream operating wavelength; and
- switching 610 the tunable transmitter on.

Figure 7:
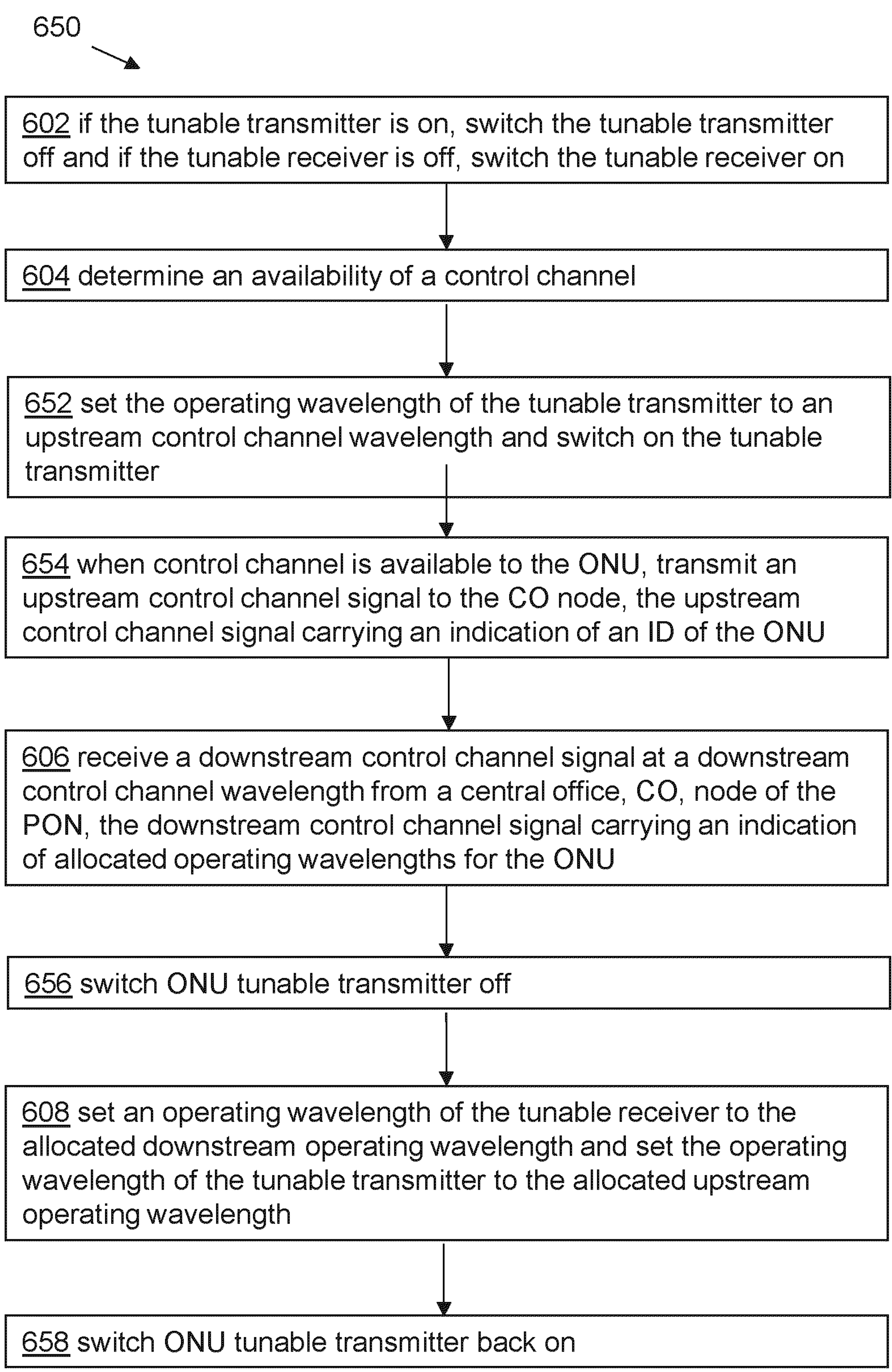

Referring to FIG. 7, an embodiment provides a method 700 of configuring an optical network unit, ONU, of a passive optical network. The ONU comprises a tunable transmitter and a tunable receiver.

The method comprises steps of:

- if the tunable transmitter is on, switching the tunable transmitter off 602 and if the tunable receiver is off, switching the tunable receiver on 602;
- determining 604 an availability of a control channel;
- setting 652 the operating wavelength of the tunable transmitter to an upstream control channel wavelength and switching on the tunable transmitter;
- transmitting 654 an upstream control channel signal to the CO node following determining the control channel is available to the ONU, the upstream control channel signal carrying an indication of an ID of the ONU;
- receiving 606 a downstream control channel signal at a downstream control channel wavelength from a central office, CO, node of the PON, the downstream control channel signal carrying an indication of allocated operating wavelengths for the ONU;
- switching off 656 the tunable transmitter;
- setting 608 an operating wavelength of the tunable receiver to an allocated downstream operating wavelength and setting the operating wavelength of the tunable transmitter to an allocated upstream operating wavelength; and
- switching 658 the tunable transmitter back on.

In an embodiment, the step of determining 604 an availability of a control channel comprises steps of:

- setting the operating wavelength of the tunable receiver to a default downstream control channel wavelength;
- determining presence or absence of a downstream control channel signal at the default downstream control channel wavelength; and
- in response to determining presence of a downstream control channel signal, determining when the control channel becomes available for use by the ONU.

In an embodiment, determining when the control channel becomes available for use by the ONU comprises determining a subsequent absence of the downstream control channel signal.

In an embodiment, the downstream control channel signal carries information including a status flag indicative of availability or unavailability of the control channel. The step of determining when the control channel becomes available for use by the ONU comprises determining that the status flag is indicative of availability of the control channel.

Referring to FIG. 8, an embodiment provides a method 700 of controlling an operating wavelength of an optical network unit, ONU, of a passive optical network, PON. The ONU comprises a tunable transmitter and a tunable receiver.

The method comprises steps at a central office, CO, node of the PON of:

- transmitting 702 a downstream control channel signal from the allocated OLT at a downstream control channel wavelength;
- determining 704 allocated operating wavelengths for an ONU of the PON; and
- transmitting 706 a further downstream control channel signal from the allocated OLT at the downstream control channel wavelength, the further downstream control channel signal carrying an indication of the allocated operating wavelengths for the ONU.

In an embodiment, the method comprises:

- transmitting 702 a downstream control channel signal from the allocated OLT at a downstream control channel wavelength;
- receiving, at the OLT allocated to the control channel, an upstream control channel signal from the ONU at an upstream control channel wavelength, the upstream control channel signal carrying an indication of an identification, ID, of the ONU;
- determining 704 the allocated operating wavelengths for the ONU depending on the ID; and transmitting 706 a further downstream control channel signal from the allocated OLT at the downstream control channel wavelength, the further downstream control channel signal carrying an indication of the allocated operating wavelengths for the ONU.

In an embodiment, the step of determining 704 allocated operating wavelengths for an ONU comprises obtaining downstream and upstream operating wavelengths from a wavelengths allocation table until all wavelengths within the wavelengths allocation table have been allocated and then using the control channel wavelengths as operating wavelengths.

In an embodiment, transmitting 702 the downstream control channel signal is followed by stopping transmitting the downstream control channel signal to indicate that the control channel is available for use.

In an embodiment, downstream control channel signals carry information including a status flag indicative of availability or unavailability of the control channel. During transmitting 702 the downstream control channel signal the status flag is indicative of availability. During transmitting 706 the further downstream control channel signal the status flag is indicative of unavailability.

Figure 9:
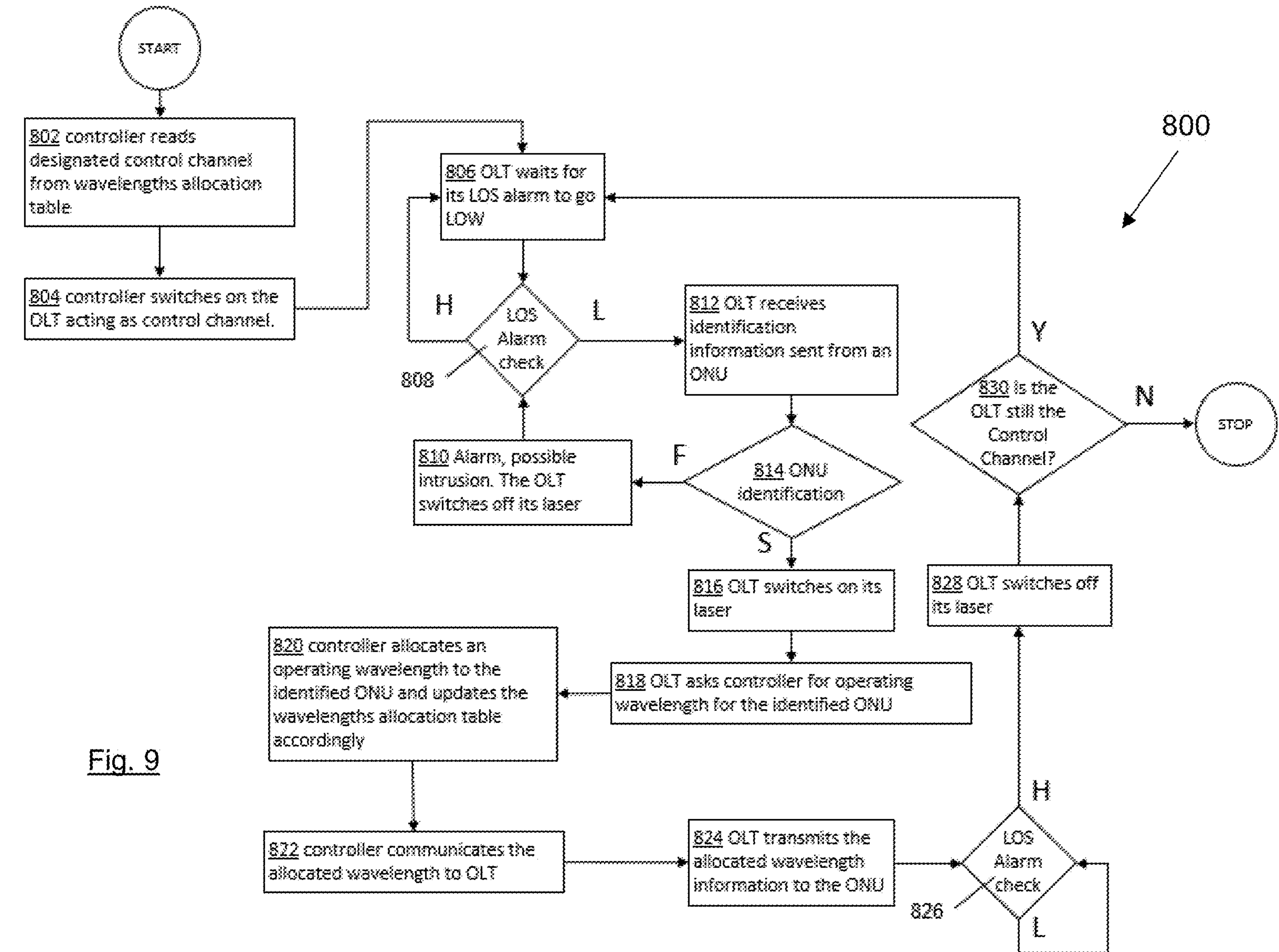
Figure 10:
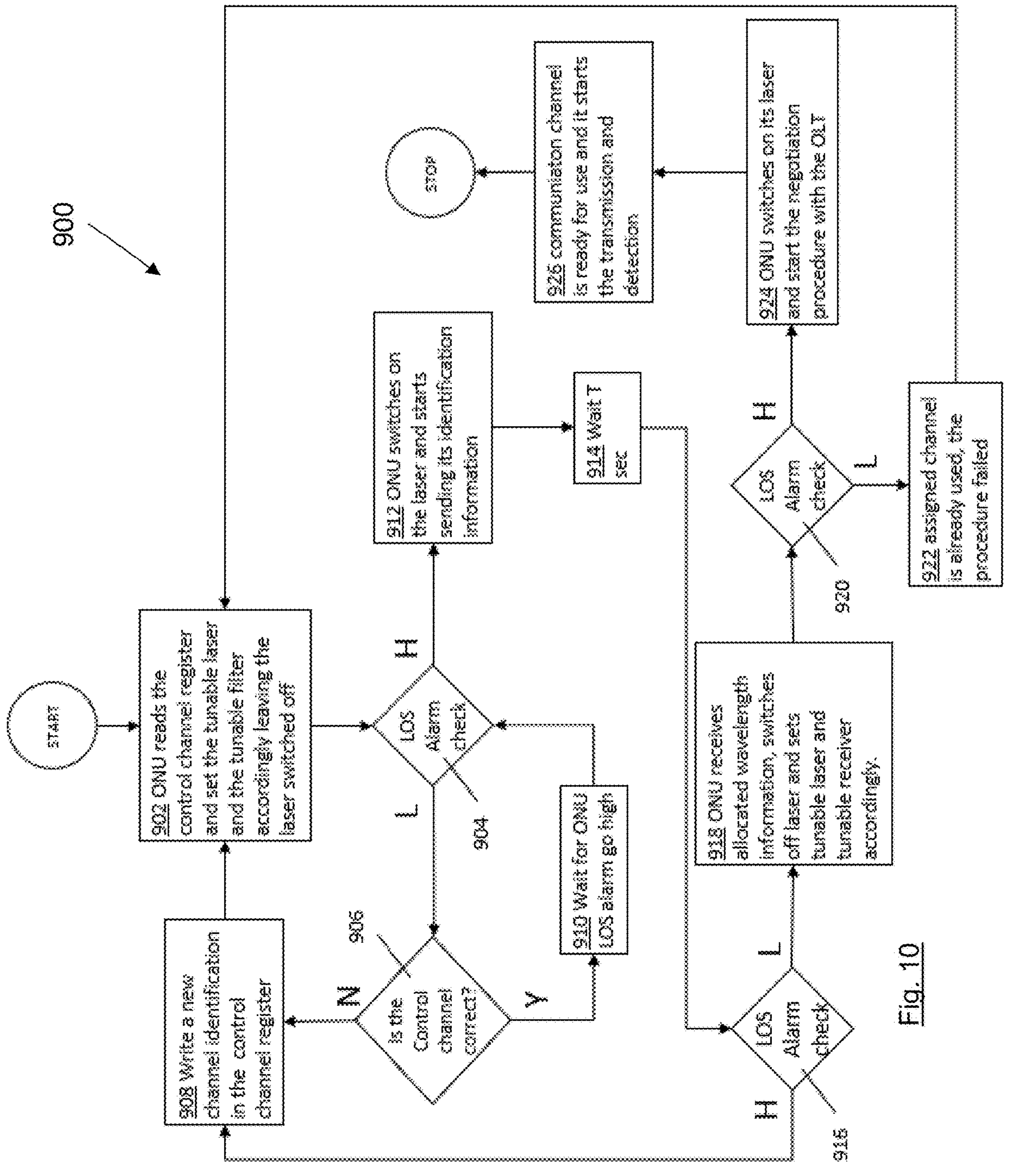

FIG. 9 illustrates steps of an embodiment of a method 800 of configuring an optical network unit, ONU, of a passive optical network, the ONU comprising a tunable transmitter and a tunable receiver. FIG. 10 illustrates steps of an embodiment of a method 900 of controlling an operating wavelength of an optical network unit, ONU, of a passive optical network, PON, the ONU comprising a tunable transmitter and a tunable receiver.

The steps of the methods 800, 900 may be performed together, for example in relation to the PONs described above in FIG. 4 and FIG. 5. The combined method comprises the following steps:

1. The CO 300 controller 320 reads 802 the designated control channel from the wavelengths allocation table and switches on 804 the OLT allocated to the control channel.
2. When a new ONU 200 is switched on, a default control channel (same for all ONUs) is set on its control channel register. The ONU (ONT) reads 902 the control channel register
3. The ONU sets 902 both tunable filter and tunable laser according to the downstream and upstream control channel wavelengths indicated in the control channel register and it leaves the transmitter switched-off.
4. The ONU checks if another ONU is using the channel by checking 904 for the presence of optical power (loss of signal, LOS, alarm check)
5. If the ONU detects the presence of optical power (LOS alarm low, L) it verifies 906 that the incoming selected signal is the correct control channel and, in case of positive answer, it waits 910 until the channel become available to it by waiting until the LOS alarm signal goes high; in case of negative answer (the ONU is not able to detect the received information), this means that a new control channel has been defined by the controller 320. Then, the ONU sets 908 a new channel for its tunable filter and comes back to the step 3.
6. Once the control channel becomes available (LOS alarm check 904 is high, H), the ONU switches on 912 its transmitter and sends an upstream control channel signal, at the upstream control channel wavelength, carrying identification information to the CO 300. The ONU then waits 914 for its LOS alarm to go LOW
7. The control channel OLT at the CO performs a LOS alarm check 808 and waits 806 for its LOS alarm 916 to go LOW.
8. When its LOS alarm goes LOW, the control channel OLT receives the ONU ID 814 on the upstream control channel signal from the ONU and performs identification 814 of the ONU.
9. If ONU identification is successful, S, the control channel ONT acknowledges the new ONU by switching on 816 its transmitter and asks 818 the CO controller for the allocated operating wavelengths for the identified ONU.
10. The CO checks 820, in a wavelengths allocation table, what wavelengths are available and allocates operating wavelengths to the identified ONU. Then, it communicates 822 the allocated operating wavelengths to the OLT and waits for its LOS alarm to go HIGH.
11. The OLT transmits 824 a downstream control channel signal to the ONU carrying an indication of the allocated operating wavelengths.
12. When the ONU receives the downstream control channel signal its LOS Alarm 916 goes LOW, the ONU receives 918 the allocated operating wavelengths information, switches off its transmitter and sets tunable filter and tunable laser at the allocated operating wavelengths communicated by the CO.
13. When the ONU switches off its transmitter, the OLT LOS alarm goes HIGH and the OLT switches off 816 its transmitter. At the CO 300, the wavelengths allocation table is updated by the controller 320.
14. The ONU performs a LOS alarm check 920 to determine that no optical power is detected at the receiver side (LOS alarm HIGH) and then switches on 924 its transmitter. If the ONU detects optical power (LOS alarm check 920 is LOW), it means the assigned channel wavelength is already in use and procedure has failed 922. Then the ONU goes back to step 2 and repeats the channel negotiation with the CO.
15. The CO acknowledges the new ONU by switching on its downstream transmitter. The optical link is ready and transmission of traffic can start.
16. When all the available wavelengths in the wavelengths table have been used, so as not to waste bandwidth the control channel wavelengths are released and assigned to the last installed ONU, removing the control channel from the wavelengths allocation table.
17. If some ONUs disconnect from the network, for example due to a fault, the controller 320 unlocks the corresponding wavelengths and updates the wavelengths allocation table, accordingly, reappointing first the control channel if necessary and returning to step 1.

Figure 11:
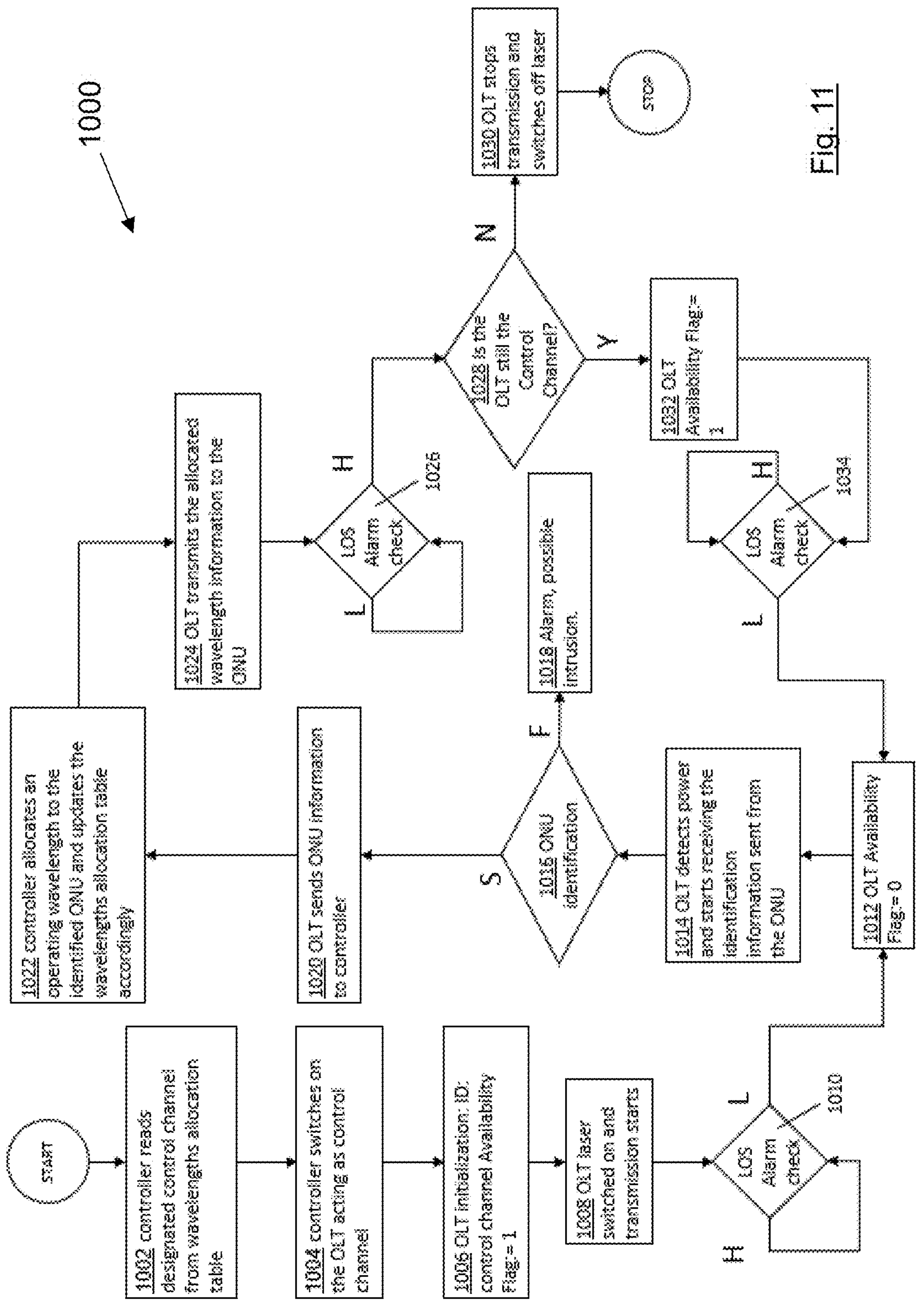
Figure 12:
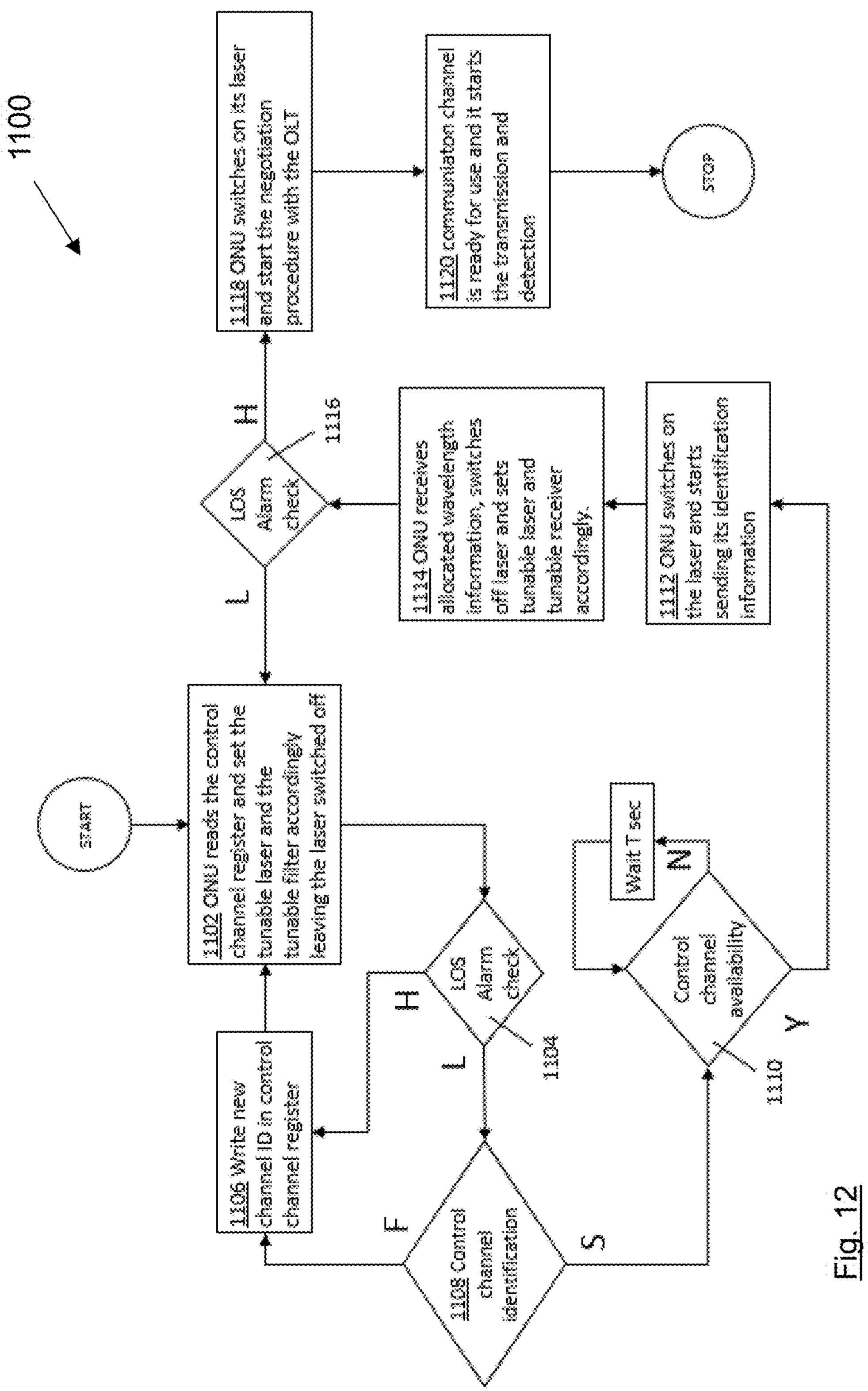

FIG. 11 illustrates steps of an embodiment of a method 1000 of configuring an optical network unit, ONU, of a passive optical network, the ONU comprising a tunable transmitter and a tunable receiver. FIG. 12 illustrates steps of an embodiment of a method 1100 of controlling an operating wavelength of an optical network unit, ONU, of a passive optical network, PON, the ONU comprising a tunable transmitter and a tunable receiver.

The steps of the methods 1000, 1100 may be performed together, for example in relation to the PONs described above in FIG. 4 and FIG. 5. The combined method comprises the following steps:

1. At the CO 300, the controller 320 reads 1002 the wavelengths allocation table and switches 1004 on the OLT allocated to the control channel. The controller provides 1006 an identifier of the control channel and a status flag indicating the availability or unavailability of the control channel. The control channel OLT then switches 1008 on its transmitter and starts transmitting a downstream, DS, control channel signal carrying the control channel ID and status flag; this information is provided within one ore more bytes of the DS control channel signal frame overhead. The OLT then checks it LOS alarm 1010 until it goes LOW.

2. When a new ONU is switched on, a default control channel (same for all ONUs) is set on its control channel register
3. The ONU reads 1102 the control channel register and sets the tunable filter and tunable laser according with the downstream and upstream control channel wavelengths indicated in the control channel register, leaving the transmitter switched-off.
4. The ONU performs a LOS alarm check 1104 for the presence of optical power at its receiver and verifies 1108 that the incoming signal is the expected control channel, checking the ID field described at step 1. In case of a successful, S, check, the method jumps to step 6 otherwise it continues with step 5.
5. If the ONU the check 1108 of the control channel ID fails, F, i.e. the ONU does not recognize the received channel as the control channel, this means that a different control channel has been defined in the wavelengths table. Then, the ONU sets 1106 the tunable receiver to a new control channel wavelength and returns to step 3.
6. The ONU reads 1110 the availability status of the control channel (checking the status flag in the control channel signal frame overhead).
7. If the status flag indicates that the control channel is unavailable, the ONU waits T seconds and then re-tests the control channel availability. In case of negative answer, it repeats this step, otherwise it continues with the next step.
8. The control channel is available for negotiation, so the ONU switches on 1112 the upstream transmitter and transmits, to the CO, an upstream control channel signal, at the upstream control channel wavelength, carrying its identification information.
9. The OLT allocated to the control channel receives optical power 1014, so its LOS alarm 1010 goes LOW. The OLT changes 1012 its status flag to unavailable, so other ONUs cannot use the control channel.
10. The OLT starts receiving 1014 the ID information sent by the ONU and performs 1016 identification of the ONU.
11. The OLT sends 1020 the ONU ID to the controller, and the controller allocates 1022 operating wavelengths to the ONU, provides the allocated operating wavelengths to the ONT and updates the wavelengths allocation table accordingly. The OLT transmits 1024 a further downstream control signal carrying an indication of the allocated operating wavelengths to the ONU. The OLT then starts a LOS alarm check 1026 until the LOS alarm goes HIGH.
12. The ONU receives 1114 the allocated wavelengths information, switches off its transmitter and sets the tunable receiver and the tunable transmitter to the allocated operating wavelengths. It leaves the tunable transmitter switched off.
13. The ONU performs 1116 a LOS alarm check that no optical power is detected at its receiver and then switches on 1118 the tunable transmitter.
14. When ONT LOS alarm check 1026 goes HIGH, the CO checks 1028 that the OLT is still the control channel. If yes, the OLT status flag is set 1032 to available. If no, the OLT allocated to the control channel stops transmission and switches off its transmitter.
15. The CO switches on the OLT transmitter at the allocated downstream wavelength for communication with the ONU. The optical link is ready and communication between the CO and the ONU can start. At the CO the wavelengths allocation table is updated accordingly.
16. In case the LOS alarm check 1116 at the ONU indicates optical power at the receiver side it means the process has failed. The ONU returns to step 3 and repeats the channel negotiation with the CO.
17. When all the available wavelengths in the wavelengths table have been used, so as not to waste bandwidth the control channel wavelengths are released and assigned to the last installed ONU, removing the control channel from the wavelengths allocation table.
18. If some ONUs disconnect from the network, for example due to a fault, the controller 320 unlocks the corresponding wavelengths and updates the wavelengths allocation table, accordingly, reappointing first the control channel if necessary, and returning to step 1.

The invention claimed is:

1. An optical network unit (ONU) for a passive optical network (PON), the ONU comprising:

a tunable receiver having a wavelength tunable operating wavelength;

a tunable transmitter having a wavelength tunable operating wavelength; and a controller comprising at least one processor and memory containing instructions executable by the at least one processor, whereby the ONU is operative to:

if the tunable transmitter is on, switch the tunable transmitter off and if the tunable receiver is off, switch the tunable receiver on;

determine an availability of a control channel;

receive a downstream control channel signal at a downstream control channel wavelength from a central office (CO) node of the PON, the downstream control channel signal carrying an indication of allocated operating wavelengths for the ONU;

set an operating wavelength of the tunable receiver to an allocated operating wavelength and set the operating wavelength of the tunable transmitter to an allocated operating wavelength; and switch the tunable transmitter on.

2. An ONU as claimed in claim 1, wherein to receive a downstream control channel signal from the CO node the ONU is operative to:

set the operating wavelength of the tunable transmitter to an upstream control channel wavelength and switch on the tunable transmitter; and transmit an upstream control channel signal to the CO node following determining the control channel is available to the ONU, the upstream control channel signal carrying an indication of an identification (ID) of the ONU;

and wherein the tunable transmitter is operative to be switched off before commencing the operation of setting the operating wavelengths of the tunable receiver and the tunable transmitter to the allocated operating wavelengths.

3. An ONU as claimed in claim 1, wherein to determine an availability of a control channel the ONU is operative to:

set the operating wavelength of the tunable receiver to a default downstream control channel wavelength;

determine presence or absence of a downstream control channel signal at the default downstream control channel wavelength; and in response to determining presence of a downstream control channel signal, determine when the control channel becomes available for use by the ONU.

4. An ONU as claimed in claim 3, wherein to determine when the control channel becomes available for use by the ONU the ONU is operative to determine a subsequent absence of the downstream control channel signal.

5. A central office (CO) node for a passive optical network (PON), the CO node comprising:

a plurality of optical line terminations (OLTs) operable at respective channel wavelengths of the PON, one of the OLTs being allocated to a control channel; and a controller comprising at least one processor and memory containing instructions executable by the at least one processor whereby the CO node is operative to:

transmit a downstream control channel signal from the allocated OLT at a downstream control channel wavelength;

determine allocated operating wavelengths for an Optical Network Unit (ONU) of the PON; and transmit a further downstream control channel signal from the allocated OLT at the downstream control channel wavelength, the further downstream control channel signal carrying an indication of the allocated operating wavelengths for the ONU;

wherein to determine allocated operating wavelengths the CO node is operative to either:

(a) receive at the allocated OLT an upstream control channel signal from the ONU at an upstream control channel wavelength, the upstream control channel signal carrying an indication of an identification (ID) of the ONU and determine the allocated operating wavelengths for the ONU depending on the ID; or (b) obtain operating wavelengths from a wavelengths allocation table contained in the memory until all wavelengths within the wavelengths allocation table have been allocated and then use the control channel wavelengths as operating wavelengths for a final ONU.

6. A CO node as claimed in claim 5, wherein transmitting the downstream control channel signal is followed by stopping transmitting the downstream control channel signal to indicate that the control channel is available for use.

7. A passive optical network comprising:

a central office (CO) node as claimed in claim 6;

a plurality of optical network units (ONUs) for a passive optical network (PON), each of the ONUs comprising:

a tunable receiver having a wavelength tunable operating wavelength;

a tunable transmitter having a wavelength tunable operating wavelength; and a controller comprising at least one processor and memory containing instructions executable by the at least one processor, whereby the ONU is operative to:

if the tunable transmitter is on, switch the tunable transmitter off and if the tunable receiver is off, switch the tunable receiver on;

determine an availability of a control channel;

receive a downstream control channel signal at a downstream control channel wavelength from the CO node of the PON, the downstream control channel signal carrying an indication of allocated operating wavelengths for the ONU;

set an operating wavelength of the tunable receiver to an allocated operating wavelength and set the operating wavelength of the tunable transmitter to an allocated operating wavelength; and switch the tunable transmitter on; and a wavelength agnostic distribution node connected to the CO by a feeder fiber and connected to the plurality of ONUs by a plurality of drop fibers.

8. The passive optical network of claim 7, further comprising:

a plurality of legacy optical line terminations, OLTs, at the CO;

a plurality of legacy ONUs;

a first coexistence filter coupling the OLTs and the legacy OLTs to the feeder fiber; and at least one further coexistence filter coupling an ONU and a legacy ONU to the distribution node.

9. A method of configuring an optical network unit (ONU) of a passive optical network (PON), the ONU comprising a tunable transmitter and a tunable receiver, the method comprising steps of:

if the tunable transmitter is on, switching the tunable transmitter off and if the tunable receiver is off, switching the tunable receiver on;

determining an availability of a control channel;

receiving a downstream control channel signal at a downstream control channel wavelength from a central office (CO) node of the PON, the downstream control channel signal carrying an indication of allocated operating wavelengths for the ONU;

setting an operating wavelength of the tunable receiver to an allocated operating wavelength and setting the operating wavelength of the tunable transmitter to an allocated operating wavelength; and switching the tunable transmitter on.

10. The method of claim 9, wherein the step of receiving a downstream control channel signal from the CO node follows additional steps of:

setting the operating wavelength of the tunable transmitter to an upstream control channel wavelength and switching on the tunable transmitter; and transmitting an upstream control channel signal to the CO node following determining the control channel is available to the ONU, the upstream control channel signal carrying an indication of an identification (ID) of the ONU;

and wherein the tunable transmitter is switched off before commencing the operation of setting the operating wavelengths of the tunable receiver and the tunable transmitter to the allocated operating wavelength.

11. The method of claim 9, wherein the step of determining an availability of a control channel comprises steps of:

setting the operating wavelength of the tunable receiver to a default downstream control channel wavelength;

determining presence or absence of a downstream control channel signal at the default downstream control channel wavelength; and in response to determining presence of a downstream control channel signal, determining when the control channel becomes available for use by the ONU.

12. The method of claim 11, wherein determining when the control channel becomes available for use by the ONU comprises determining a subsequent absence of the downstream control channel signal.

13. The method of claim 11, wherein the downstream control channel signal carries information including a status flag indicative of availability or unavailability of the control channel and wherein determining when the control channel becomes available for use by the ONU comprises determining that the status flag is indicative of availability of the control channel.

14. A method of controlling an operating wavelength of an optical network unit (ONU) of a passive optical network (PON), the ONU comprising a tunable transmitter and a tunable receiver, the method comprising steps at a central office (CO) node of the PON of:

transmitting a downstream control channel signal from an Optical Line Terminal (OLT), allocated for a control channel from a plurality of optical line terminations (OLTs) operable at respective channel wavelengths of the PON, at a downstream control channel wavelength;

determining allocated operating wavelengths for an ONU of the PON; and transmitting a further downstream control channel signal from the allocated OLT at the downstream control channel wavelength, the further downstream control channel signal carrying an indication of the allocated operating wavelengths for the ONU; and wherein said determining allocated operating wavelengths comprises either:

(a) receiving, at the OLT allocated for the control channel, an upstream control channel signal from the ONU at an upstream control channel wavelength, the upstream control channel signal carrying an indication of an identification (ID) of the ONU and determining the allocated operating wavelengths for the ONU depending on the ID; or (b) obtaining operating wavelengths from a wavelengths allocation table until all wavelengths within the wavelengths allocation table have been allocated and then use the control channel wavelengths as operating wavelengths for a final ONU.

15. The method of claim 14, wherein transmitting the downstream control channel signal is followed by stopping transmitting the downstream control channel signal to indicate that the control channel is available for use.

16. The method of claim 14, wherein downstream control channel signals carry information including a status flag indicative of availability or unavailability of the control channel and wherein during transmitting the downstream control channel signal the status flag is indicative of availability and during transmitting the further downstream control channel signal the status flag is indicative of unavailability.

* * * * *